Figure 1:
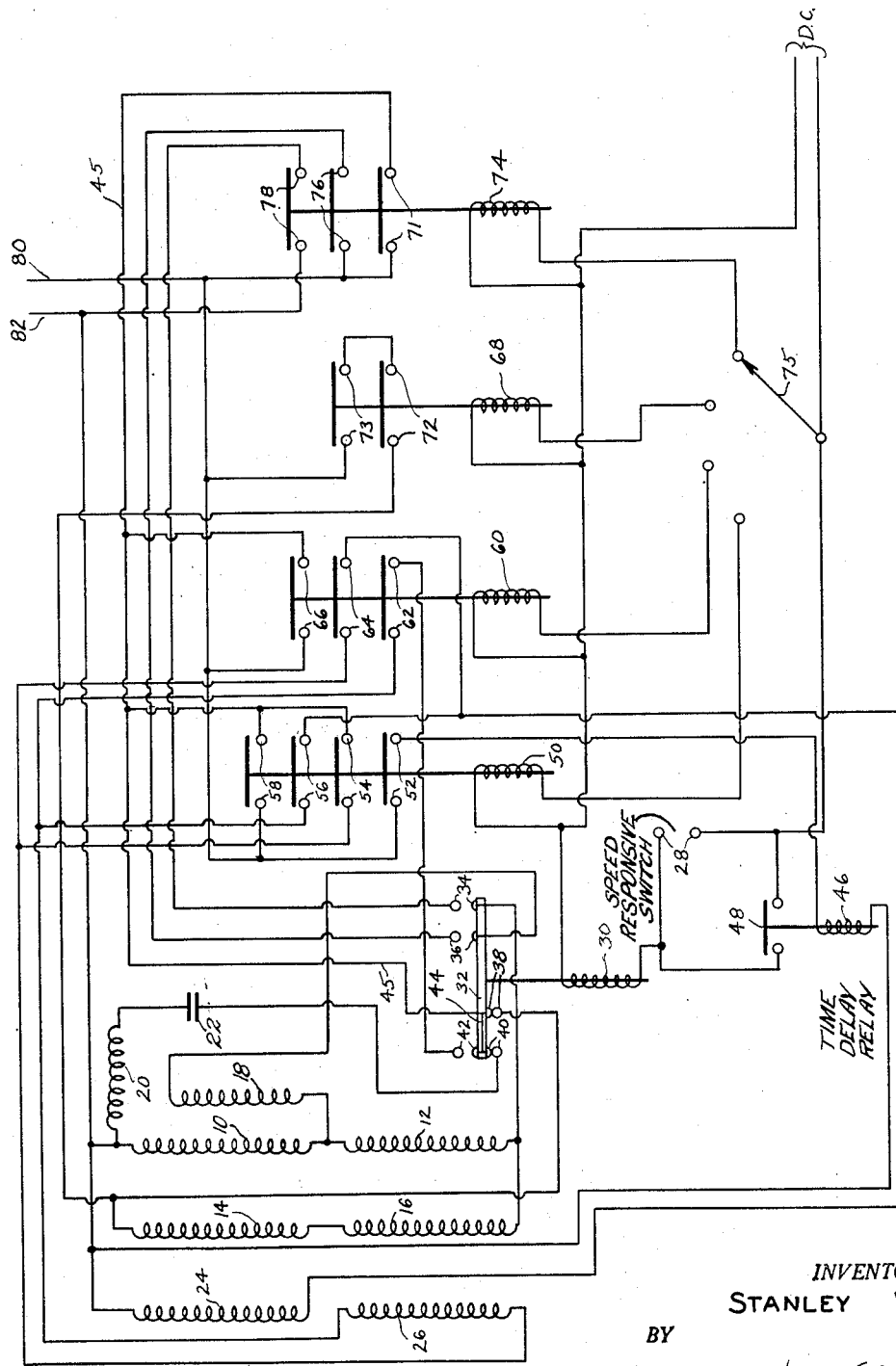

Dec. 18, 1956 S. WITT 2,774,924
MULTISPEED SINGLE PHASE MOTOR
Filed Feb. 24, 1953 3 Sheets-Sheet 1

INVENTOR.
STANLEY WITT
BY
*Ray Eilers*
ATTORNEY

INVENTOR.
STANLEY WITT

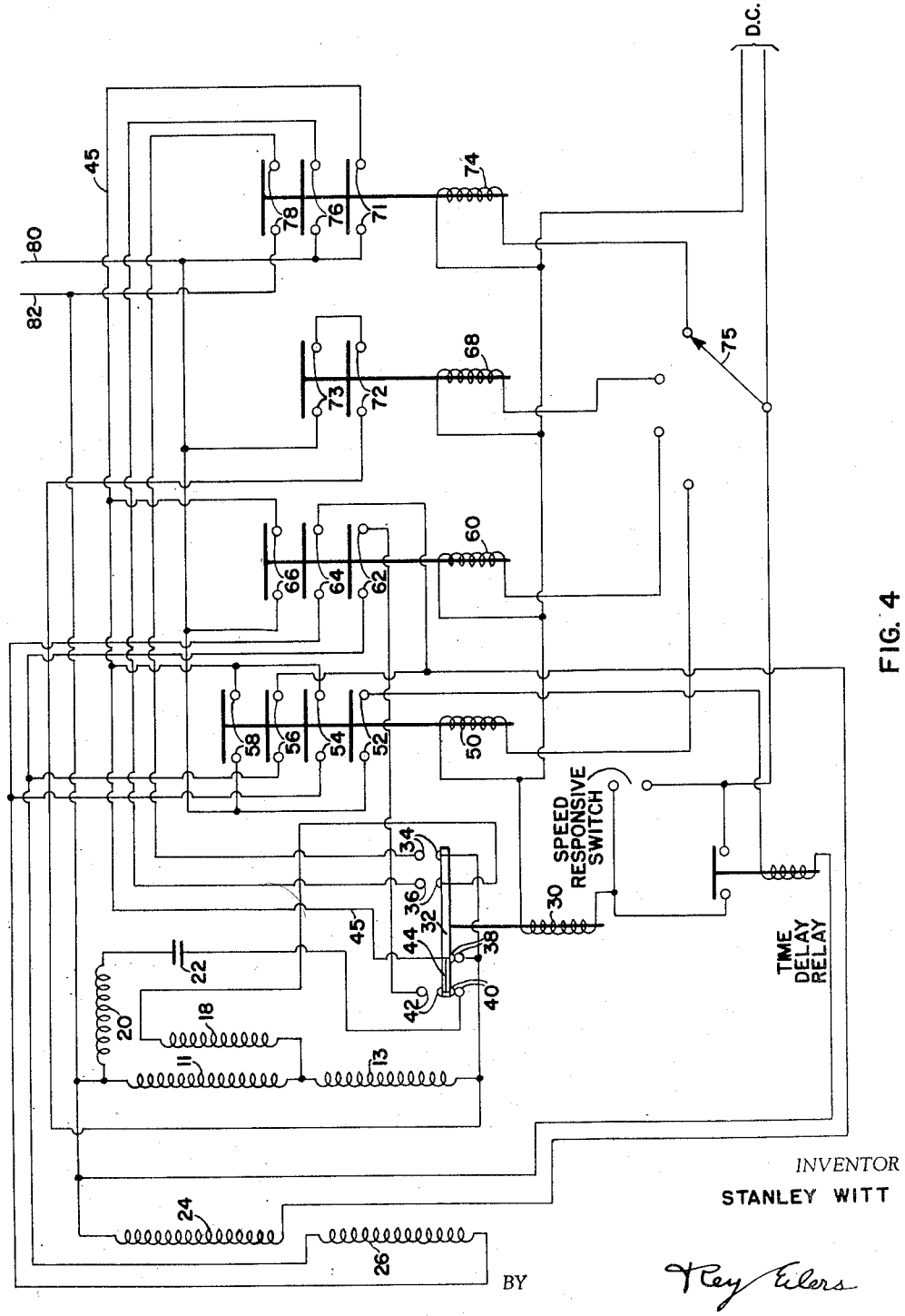

United States Patent Office 2,774,924
Patented Dec. 18, 1956

2,774,924

MULTISPEED SINGLE PHASE MOTOR

Stanley Witt, St. Louis, Mo., assignor to Century Electric Company, St. Louis, Mo., a corporation of Missouri Application February 24, 1953, Serial No. 338,487

8 Claims. (Cl. 318—224)

This invention relates to improvements in dynamo electric machines. More particularly this invention relates to improvements in multi-speed electric motors.

It is therefore an object of the present invention to provide an improved multi-speed electric motor.

Multi-speed electric motors have been known and used for many years but many of those motors were unduly large and heavy. The cost of the materials going into motors and the currently desirable smaller dimensions specified for motors make it imperative to reduce the size and weight of motors. However, in making these reductions in size and weight, consideration must be given to assuring adequate starting and running torque values. Moreover, consideration must be given to quiet operation of the motors and to the need of low temperature rise characteristics. The present invention provides a multi-speed motor which has adequate starting and running torque characteristics, that operates quietly, and that has a low temperature rise characteristic and yet is low in weight and small in size. The present invention attains this result by utilizing one of the multi-speed windings as the initial running winding for the motor and then acts through a delayed action switch to energize the running winding needed for the particular speed desired. With such an arrangement, the said initial running winding can be designed to have powerful torque characteristics that are well in excess of the torque characteristics of the other windings of the motor. In this way, prompt and powerful starting is assured. It is therefore an object of the present invention to provide a multi-speed electric motor wherein one of the multi-speed windings is the initial running winding for each setting of the motor.

The multi-speed electric motor provided by the present invention has windings which can be used at different speeds. In this way, the minimum amount of metal is required and the maximum utility is obtained from that metal which is used. In particular, one form of the multi-speed electric motor provided by the present invention utilizes one consequent pole winding to provide two different speeds for the motor and uses a second consequent pole winding to provide two other speeds for the motor. Specifically, one of the consequent pole windings can provide the lowest and next lowest speeds and the other consequent pole winding can provide the highest and next highest speeds. With such an arrangement, two windings can provide four speeds for the motor. It is therefore an object of the present invention to provide a multi-speed electric motor which has a consequent pole winding to provide the lowest and next lowest speeds and has a second consequent pole winding to provide the highest and next highest speeds.

Consequent pole windings are familiar to those skilled in the art and they have been used. Such windings offer certain economies, but they also bring certain disadvantages. For example, the number of turns that must be placed in some of the slots of stators of motors having consequent pole windings will be much greater than the number of turns that must be placed in the slots of motors having distributed windings; and this fact can lead to an enforced reduction in the size of the conductors of the windings or to an increase in the size of the stator cores. Neither of these alternatives is desirable. Again, the winding distribution factor in motors which have consequent pole windings is not as favorable as the winding distribution factor for motors having distributed windings; and this means that a greater number of turns must be provided in consequent pole windings to provide the same amount of magnetic flux. In addition, the use of consequent pole windings can require the use of a greater amount of core material than would be needed for distributed windings of a comparable size, because the core may have to be over-magnetized to some extent to obtain the needed torque values for some speeds. For these various reasons, many motors that use consequent pole windings have had inadequate running and starting torque characteristics, and they have been noisier than motors with fully distributed, symmetrical windings. The said one form of the present invention makes use of the advantageous characteristics of consequent pole windings while minimizing the disadvantages that normally are a part of such windings; and it does so by providing a consequent pole winding that has good starting and running characteristics when it is energized to generate a predetermined number of poles and thus drive the rotor at one speed, and by providing an auxiliary winding to coact with that winding, to provide desirable running characteristics when that winding is energized to generate a different number of poles and to drive the rotor at a different speed. Such an arrangement avoids many of the undesirable compromises that are customarily made in designing consequent pole windings, since the auxiliary winding can be used to supply characteristics that would normally be supplied solely by the consequent pole winding. As a result the motor will have starting and running characteristics that are better than those attainable by ordinary consequent pole wound motors. It is therefore an object of the present invention to provide a consequent pole winding that has good starting and running characteristics when it is energized to generate a predetermined number of poles and thus drive the rotor at one speed, and to provide an auxiliary winding that coacts with that winding to provide desirable running characteristics when that winding is energized to provide a different number of poles and to drive the rotor at a different speed.

The provision of a consequent pole winding that has good starting and running characteristics at one speed, and the provision of a delayed action switch that can disconnect that winding and energize other running windings, make it possible to employ a second consequent pole winding which will have good running characteristics at two other speeds. This is due to the fact that the second consequent pole winding does not have to have good starting characteristics and can be designed for running characteristics exclusively.

The auxiliary winding provided by the said one form of the present invention will be disposed in the slots that are normally unused in consequent pole type motors. The auxiliary winding will have its magnetic axis coaxial with the magnetic axis of the high speed consequent pole winding, and it will have one terminal thereof connected to a center tap on the consequent pole winding. The auxiliary winding can then be operated in series with the two sections of the high speed winding which can be placed in parallel with each other; and where this is done the auxiliary winding and the consequent pole winding will coact to provide a distribution which can be sinusoidal or substantially sinusoidal in nature. As a result, the consequent pole wnding can actually provide the desirable performance of a distributed winding.

It is therefore an object of the present invention to provide a consequent pole winding motor with an auxiliary winding that has its magnetic axis coaxial with the magnetic axis of the consequent pole winding and which has one end thereof connected to a center tap of the consequent pole winding.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

In the drawing:

Fig. 1 is a schematic diagram of multi-speed motor that is made in accordance with the principles and teachings of the present invention.

Figure 2:
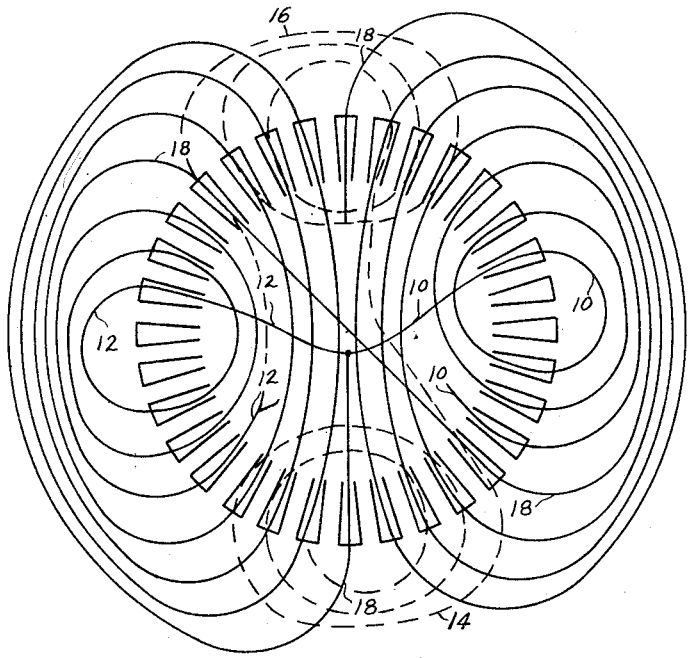
Figure 3:
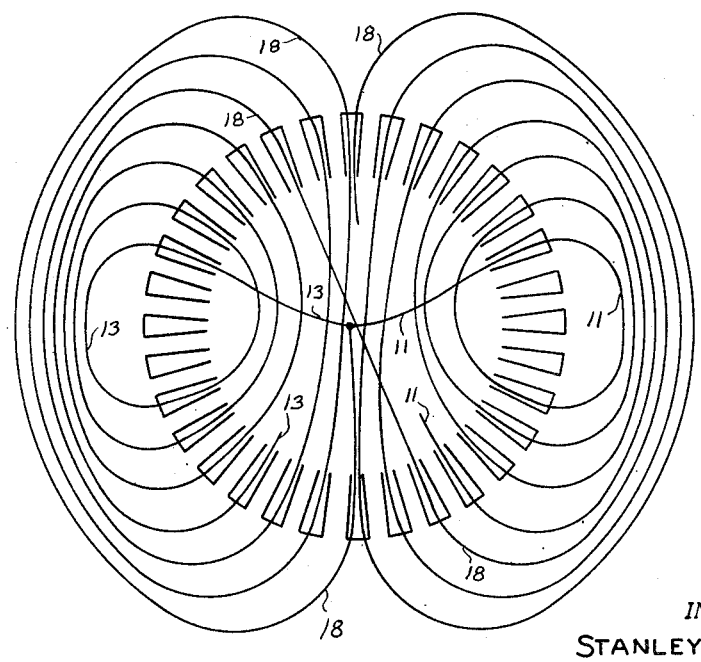

Fig. 2 is a schematic diagram of the stator of an electric motor and an auxiliary winding and distributed winding for that stator, Fig. 3 is a schematic diagram of the stator of an electric motor and an auxiliary winding and a consequent pole winding for that stator, and Fig. 4 is a schematic diagram of another multi-speed motor that is made in accordance with the principles and teachings of the present invention.

Referring to the drawing in detail, a number of windings are disposed in the slots of the stator of a multi-speed single phase motor. Thus, Figs. 1 and 2 show a number of windings; and, as Fig. 2 emphasizes, those windings are disposed in the coil slots of the motor. The winding 10 forms one wound pole for the stator, and the winding 12 forms a second wound pole for that stator. The winding 10 and the winding 12 are wound in the same direction; and hence when current flows serially from the upper or outer end of winding 10 to the lower or outer end of winding 12, the two windings generate two wound poles of like instantaneous polarity.

A center tap is provided at the lower or inner end of winding 10 and at the upper or inner end of winding 12. This center tap makes it possible to connect the windings 10 and 12 in parallel and thereby cause the current to flow through one of those windings in a direction opposite to the direction in which the current flows through the other winding. This oppositely directed flow of current causes the windings 10 and 12 to generate two poles of opposite instantaneous polarity rather than of like instantaneous polarity.

The winding 14 forms a third wound pole for the stator, and the winding 16 forms a fourth wound pole for the stator. These windings have been shown by dashed lines in Fig. 2 to make it easy to distinguish between the various windings. The windings 14 and 16 generate two wound poles on the stator that are of like instantaneous polarity; and the poles generated by the windings 14 and 16 will be disposed between, and will be of opposite instantaneous polarity to, the wound poles generated by the windings 10 and 12. The lower or outer ends of windings 12 and 16 are connected together, as shown in Figs. 1 and 2. The windings 10, 12, 14 and 16 constitute a four pole fully distributed winding, and the winding 18 is an auxiliary winding. An auxiliary winding 18 is connected to the center tap between the windings 10 and 12. This auxiliary winding will occupy the same slots in the stator of the motor that the windings 14 and 16 occupy. The magnetic axis of the auxiliary winding 18 will be coaxial with the magnetic axis of the windings 10 and 12, and it will increase the expanse of the wound poles generated by the windings 10 and 12. If the windings 10 and 12 were to be used to generate two wound poles of opposite instantaneous polarity, the motor would not have adequate running characteristics. However, when operated in conjunction with the auxiliary winding, those windings provide running characteristics that actually are those of fully distributed two pole windings. This is accomplished by directing current through the auxiliary winding 18 to the center tap and then outwardly through the windings 10 and 12. The windings 10, 12, 14, 16 and 18 of Figs. 1 and 2 can be used to form a fully distributed four pole winding, as when windings 10, 12, 16 and 14 are connected so current flows through them serially. The windings 10, 12, 14, 16 and 18 of Figs. 1 and 2 can be used to form a fully distributed two pole winding, as when winding 18 is connected to windings 10 and 12 so current flows through winding 18 to the center tap and then flows to the outer ends of the windings 10 and 12.

The winding 11 of Fig. 3 forms a wound pole for the stator of Fig. 3, and the winding 13 forms a second wound pole for that stator. The winding 11 and the winding 13 are wound in the same direction; and hence when current flows serially from the outer end of winding 11 to the outer end of winding 13, the two windings generate two wound poles of like instantaneous polarity. Those poles will generate two consequent poles; the two consequent poles being formed adjacent the top and bottom of the stator in Fig. 3.

A center tap is provided at the inner ends of windings 11 and 13. This center tap makes it possible to connect the windings 11 and 13 in parallel and thereby cause the current to flow through one of those windings in a direction opposite to the direction in which the current flows through the other winding. This oppositely directed flow of current causes the windings 11 and 13 to generate two poles of opposite instantaneous polarity rather than of like polarity. Hence, the windings 11 and 12 can generate four poles or two poles, as desired.

The auxiliary winding 18 of Fig. 3 is very similar to the auxiliary winding 18 of Figs. 1 and 2. That winding is connected to the center tap between windings 11 and 13, and it occupies the slots intermediate the slots occupied by windings 11 and 13. The magnetic axis of the auxiliary winding 18 will be coaxial with the magnetic axis of the windings 11 and 13, and it will increase the expanse of the wound poles generated by the windings 11 and 13. If the windings 11 and 13 were to be used to generate two wound poles of opposite instantaneous polarity, the motor would not have adequate running characteristics. However, when operated in conjunction with the auxiliary winding, the windings 11 and 13 provide running characteristics that actually are those of fully distributed two pole windings. This is accomplished by directing current through the auxiliary winding 18 and then outwardly through the windings 11 and 13.

In Fig. 1, the numeral 20 denotes the starting winding of the motor, and one end of that winding is connected to the outer end of the winding 10. The other end of the starting winding 20 is connected to the capacitor 22. Thus, the starting winding 20 is a capacitor or split-phase starting winding.

The numeral 24 denotes a winding that can generate four wound poles for the stator of Figs. 1 and 2; and the numeral 26 denotes a winding that can generate four additional wound poles for that stator. The winding 24 and the winding 26 are wound in the same direction; and hence when current is flowing in the same direction through those windings, those windings generate eight wound poles of like instantaneous polarity. Those eight poles will generate eight consequent poles, thereby providing a total of sixteen poles for the stator of Figs. 1 and 2. Whenever desired, the current in winding 24 can be made to flow in a direction opposite to the direction of flow of the current in winding 26. This oppositely directed flow of current causes the windings 24 and 26 to generate four poles of one instantaneous polarity and to generate four poles of opposite instantaneous polarity. Hence the windings 24 and 26 can provide sixteen or eight pole operation, as desired.

The numeral 28 denotes the normally open contacts of a speed responsive switch. This switch may be of standard and usual design, and it will respond to rotation of the rotor of the motor to close the contacts 28. In one particular embodiment of the present invention, it has been found desirable to have the speed-responsive switch close the contacts 28 when the rotor attains a speed of about 1100 R. P. M.

The numeral 30 denotes the coil of a relay, and that relay has an armature 32 that is movable by the coil. A number of contacts are mounted on the armature 32; those contacts being in pairs or sets. One set of contacts on the relay armature 32 is denoted by the numeral 34, another set of contacts is denoted by the numeral 36, yet another set of contacts is denoted by the numeral 38, still another set of contacts is denoted by the numeral 40, and the last set of contacts is denoted by the numeral 42. A bridging conductor 44 is provided on the armature 32 and it extends between corresponding contacts of the sets of contacts 38 and 40. A flexible lead 45 extends from armature 32 to the contacts of the relays which control the speed at which the motor operates. Specifically, that lead extends to the contacts 54 and 58 of relay 50, extends to the contacts 66 of relay 60, and extends to the contacts 71 of relay 74. The relay 50 has two additional sets of contacts 52 and 56, the relay 60 has two additional sets of contacts 62 and 64, the relay 68 has two sets of contacts 72 and 73, and the relay 74 has two additional sets of contacts 76 and 78. The relays 50, 60, 68 and 74 are selectively connected across a source of direct current by the manually operated selector switch 75.

The numeral 46 denotes the coil of a time delay relay and the numeral 48 denotes the contacts of that time delay relay. This relay may be of standard and usual construction and will have a time lag which is greater than the time required by the speed-responsive switch to close the contacts 28 when the motor is running on its three fastest speeds. The contacts 28 of the speed-responsive switch and the contacts 48 of the time delay relay are in parallel with each other and are connected in series with the coil 30 of the relay. As a result, when the contacts 28 close or when the contacts 48 close, the armature 32 will move from its normal position, shown in the drawing, until it opens the contacts 38 and 40 and closes the contacts 34, 36 and 42. The speed-responsive switch and the delayed action switch coact to provide a delayed action movement of armature 32. This enables the motor to attain running speed before that armature moves.

The numerals 80 and 82 denote motor terminals which can be connected to line voltage. In actual practice the terminals 80 and 82, the relays 50, 60, 68 and 74, and the contacts of switch 75 will be enclosed in a controller box but the connections between the motor and that controller box will be as shown in the drawing.

To operate the motor as a two pole 3600 R. P. M. motor, it is only necessary to move the selector switch 75 to a position shown in the drawing where it places the relay coil 74 across the direct current line. This will energize the coil 74 and will close the contacts 71, 76 and 78. Current will flow serially from terminal 82 through the windings 10 and 12 through the windings 16 and 14, through the contacts 38, through the flexible lead 45, and through the contacts 71 of the relay 74 to the terminal 80. Simultaneously current will flow from the terminal 82 through the starting winding 20 through the capacitor 22, through the contacts 40, through the bridging conductor 44, through the lead 45, and through the contacts 71 of relay 74 to the terminal 80. As described above, the serial flow of current through windings 10 and 12 will generate two wound poles of like instantaneous polarity, and the serial flow of current through windings 16 and 14 will generate two wound poles of like instantaneous polarity; and the poles generated by the windings 16 and 14 will be disposed between, and will be of opposite instantaneous polarity to, the poles generated by windings 10 and 12. This will cause the motor to start rotating and operating as a four pole motor. The four windings 10, 12, 16 and 14 will be wound to provide extremely desirable starting torque and running torque characteristics for the motor and those starting torque characteristics will provide adequate starting characteristics for the motor when it is intended to be operated as a two pole 3600 R. P. M. motor. The motor will continue to operate as a four pole motor until the rotor reaches a speed of about 1100 R. P. M. and thereupon the speed responsive switch will close the contacts 28. Closing of the contacts 28 will energize the relay 30 and move the armature upwardly; thus breaking the circuits at contacts 38 and 40, and closing the contacts 34, 36 and 42. The movement of the armature 32 will disconnect the starting winding 20 from the line and will disconnect the windings 14 and 16 from the line. Current will continue to flow from the terminal 82 into the windnig 10, but that current will find its way to the other terminal 80 through the auxiliary winding 18, through the contacts 36, and through the contact 76 of the relay 74. Current will also flow from the terminal 82 through the contacts 78 of relay 74, through the contacts 34 of relay 30, and through the winding 12 to the auxiliary winding 18 and thence through the contacts 36 and 76 to the terminal 80. It will be noted that when the motor started, the windings 10 and 12 were connected in series and that when the speed responsive switch caused the armature 32 to move upwardly the windings 10 and 12 were connected in parallel with each other and in series with the auxiliary winding 18. Initially, therefore, the motor will start under the action of the starting winding 20 and the four windings 10, 12, 16 and 14, which serve as a four pole distributed winding, and it will continue under the action of those windings until it reaches a speed of about 1100 R. P. M. Thereupon the armature 32 will be moved, and the motor will speed up under the action of the auxiliary winding 18 and the windings 10 and 12 until it reaches a speed of 3600 R. P. M. The auxiliary winding 18 will, as described above, increase the expanse of the poles generated by windings 10 and 12, and hence the motor will operate as a two pole distributed winding motor. That motor will continue to operate as a two pole distributed winding motor and will maintain a synchronous speed of 3600 R. P. M. The motor will continue to rotate until the selector switch 75 is moved to break the circuit through the coil 74 or until a power failure occurs.

If it is desired to operate the motor at a speed of 1800 R. P. M., it is only necessary to set the selector switch 75 so it energizes the relay coil 68. This will close the contacts 72 and 73. Current will flow from the terminal 82 through the windings 10 and 12, through the windings 16 and 14, and then through the contacts 72 and 73 of the relay 68 to the terminal 80. Current will simultaneously flow from terminal 82 through starting winding 20, through capacitor 22, through contacts 40, through bridging conductor 44, through contacts 38 and then through contacts 72 and 73 of relay 68 to terminal 80. This will cause the motor to start as a four pole distributed winding motor, and as the rotor picks up speed the speed responsive switch will close the contacts 28 and energize relay 30. This will break the circuit to the starting winding 20 at contacts 38 and 40 at about 1100 R. P. M.; and the motor will continue to speed up until it reaches the synchronous speed of 1800 R. P. M. Thereafter the motor will continue to operate under the action of the four windings 10, 12, 16 and 14 which constitute the running winding until the selector switch 75 is moved or until a power failure occurs.

If it is desired to operate the motor at a speed of 900 R. P. M., it is only necessary to set the selector switch 75 so it energizes the relay coil 60. This will close the contacts 62, 64 and 66. Current will flow from the terminal 82 through the windings 10 and 12, through the windings 16 and 14, through the contacts 38, through the lead 45, and through the contacts 66 to the terminal 80. Simultaneously current will flow from the terminal 82 through the starting winding 20, through the capacitor 22, through the contacts 40, through the bridging conductor 44, through the lead 45, and through the contacts 66 of coil 60 to the terminal 80. This will cause the motor to start operating as a four pole motor. When the motor attains a speed of about 1100 R. P. M., the speed responsive switch will operate and close the contacts 28; thus interrupting the circuits to the starting winding 20 and to the four pole running winding, constituted by windings 10, 12, 16 and 14, at the contacts 40 and 38 respectively. Current will then flow from the terminal 82 through the winding 24, through the contacts 64 of the relay 60, through the winding 26 in a direction opposite to the direction of current flow in winding 24, through the contacts 62 of the relay 60, through the contacts 42, through the bridging conductor 44, through the lead 45, and then through the contacts 66 of relay 60 to the terminal 80. When current flows through the windings 24 and 26 in this manner, as is the case when the selector switch 75 energizes the coil 60, those windings generate eight wound poles. The resultant eight pole winding cannot sustain the speed of the motor at 1100 R. P. M. and the motor will slow down to the synchronous speed of 900 R. P. M., and it will continue to rotate at that speed.

If it is desired to operate the motor at a speed of 450 R. P. M., the selector switch 75 can be set to energize the coil 50. Such energization will close the contacts 52, 54, 56 and 58. Current will flow from the terminal 82 through the windings 10 and 12, through the windings 16 and 14, through the contacts 38, through the lead 45, and through the contacts 58 of relay 50 to the terminal 80. Simultaneously, current will flow from the terminal 82 through the starting winding 20, through the capacitor 22, through the contacts 40, through the bridging conductor 44, through the lead 45, and through the contacts 58 of relay 50 to the terminal 80. In addition, current will flow from terminal 82 through winding 24, through the contacts 56 of relay 50, through the winding 26 in the same direction, through the contacts 54 of relay 50, and through the contacts 58 of that relay to the terminal 80. The windings 10, 12, 14 and 16 will generate four poles for the motor and the windings 24 and 26 will generate sixteen poles for the motor; and the motor will start operating under the influence of the two sets of poles. However, because of its good starting torque characteristics, the four pole winding will provide most of the initial power. The four pole winding will not be able to accelerate the motor beyond the synchronous speed of 450 R. P. M. because the windings 24 and 26 will hold the motor to that speed; and hence the speed-responsive switch will not operate. The motor will continue to operate at a speed of 450 R. P. M. with the starting winding, the four pole winding and the sixteen pole winding connected across the line until, after a predetermined time lag, the time delay relay 46 will close the contacts 48 and energize the relay coil 30. This will break the circuits to the starting winding 20 and to the four pole running winding at the contacts 40 and 38 respectively. The motor will continue to operate at 450 R. P. M. under the action of windings 24 and 26.

With this construction, the motor is enabled to provide four synchronous speeds and yet to provide very desirable starting, torque characteristics. Moreover, this arrangement makes it possible to give the motor running characteristics that are comparable to those of a fully distributed two pole motor even though the winding which produces such characteristics is part of a four pole distributed winding together with an auxiliary winding.

The distribution of the turns of the auxiliary winding and of the windings 10, 12, 16 and 14 of the four pole winding is well illustrated in Fig. 2. A sinusoidal or nearly sinusoidal distribution can be attained by the use of the auxiliary winding.

The use of a selector switch 75 and four relays to determine the speeds at which the motor will operate is very convenient. However, if desired, the selector switch 75 and the four relays could be replaced by four switches which had contacts comparable to the contacts 52, 54, 56 and 58 of relay 50, the contacts 62, 64 and 66 of the relay 60, the contacts 72 and 73 of the relay 68, and the contacts 71, 76 and 78 of the relay 74. The operation of the motor would be the same but the manipulation would not be quite as convenient or easy.

The speed responsive switch and the time delay relay act to provide a delayed action for the motor. Other types of delayed action switches could be substituted. For example, if it were desired to do so, a thermal switch could be substituted and a small heat coil could be placed across the line when the motor was energized.

Fig. 3 shows the distribution of the auxiliary winding 18, with the two windings 11 and 13 of a 2/4 pole consequent pole winding. As described above, the windings 11 and 13 can be connected in series to generate two wound poles and two consequent poles, or they can be connected in parallel to generate two wound poles.

As described above, the windings 10, 12, 16 and 14 can be connected to provide four pole or two pole operation; and since the windings 11 and 13 can be connected to provide four pole or two pole operation, the windings 11 and 13 are, to some extent at least, comparable to the windings 10, 12, 16 and 14. In fact, as Fig. 4 shows, the windings 11 and 13 can be substituted for the windings 10, 12, 16 and 14. The winding 11 has its outer end connected to the terminal 82 and to one end of starting winding 20 in the same way the winding 10 is connected in Fig. 1 but the outer end of the winding 13 is connected to the contacts 38 and to the contacts 72 in the same way the upper end of the winding 14 is connected to those contacts. Where this is done, the windings 11 and 13 will provide four pole operation during starting at all speeds, but will provide two pole operation when the selector switch 75 is set to operate the relay 74 and the delayed action device has operated. For example, when relay 74 is energized, current will flow from terminal 82 through the windings 11 and 13 in the same direction, through the contacts 38, through the bridging conductor 44, through the lead 45, and through the contacts 71 of relay 74 to terminal 80. When armature 32 moves, current will flow from terminal 82 through winding 11, through auxiliary winding 18, through contacts 36, and through contacts 76 of relay 74 to terminal 80. Current will also flow from terminal 82 through contacts 78 of relay 74, through contacts 34, through winding 13 in the opposite direction, through the auxiliary winding 18, through the contacts 36 and through the contacts 76 to the terminal 80. This provides two pole operation of the motor. When relay 68 is energized the current will flow continuously from terminal 82 through windings 11 and 13 in the same direction and through contacts 72 and 73 of relay 68 to terminal 80. This provides four pole operation of the motor. As is the case with the motor of Figs. 1 and 2, the auxiliary winding 18 of the motor of Figs. 3 and 4 will improve the running characteristics of the motor on two pole operation.

The use of the auxiliary winding is very desirable in the motors of Figs. 1 and 2 and Figs. 3 and 4 because it enables those motors to have operating characteristics closely approximating those of motors having two pole distributed windings in addition to four pole distributed windings. Thus, one auxiliary winding has been combined with one consequent pole winding or with a part of a distributed winding to provide characteristics formerly obtained only with two distributed windings.

If the auxiliary winding principle were used on a two speed motor, it would not be necessary to use the relay 30 and the armature 32. Instead, the contacts 38 and 40 could be mounted directly on the speed-responsive switch. This would obviate the need of the outside source of power for the relay 30.

Whereas two preferred embodiments of the present invention have been shown and described in the drawing and accompanying description, it should be apparent to those skilled in the art that various changes may be made in the form of the invention without affecting the scope thereof.

What I claim is:

1. A multispeed single phase motor comprising a primary winding arranged to selectively produce a first or a second predetermined number of poles, said primary winding including a tapped section comprising at least two poles selectively connectible in series to form alternate poles of like instantaneous polarity for producing said first predetermined number of poles or in parallel to form adjacent poles of opposite instantaneous polarity for producing said second predetermined number of poles, and an auxiliary winding wound in slots adjacent the slots occupied by said two poles of said tapped section and having polar axes coaxial with the polar axes of said two poles, said auxiliary winding being connected to the tap of said tapped section and energized in series with the windings of said tapped section only when said section is connected to produce said second predetermined number of poles.

2. A motor as defined in claim 1 in which consequent poles are formed between the said two poles when connected for said first predetermined number of poles.

3. A motor as defined in claim 1 in which a second section of the primary winding is provided for forming real poles between said two poles when connected for said first predetermined number of poles.

4. A multispeed single phase motor comprising a primary winding arranged to selectively produce a first or a second predetermined number of poles, said primary winding including at least two pole-generating windings selectively connectible in series to form alternate poles of like instantaneous polarity for producing said first predetermined number of poles or in parallel to form adjacent poles of opposite instantaneous polarity for producing said second predetermined number of poles, and an auxiliary winding wound in slots adacent the slots occupied by said pole-generating windings of said primary winding and having polar axes coaxial with the polar axes of said pole-generating windings of said primary winding, said auxiliary winding being connectible in series with said pole-generating windings whenever said pole-generating windings are connected in parallel to produce said second predetermined number of poles, said auxiliary winding increasing the expanse of the poles produced by said pole-generating windings.

5. A multispeed single phase motor comprising a primary winding arranged to selectively produce a first or a second predetermined number of poles, said primary winding including at least two pole-generating windings selectively connectible in series to form alternate poles of like instantaneous polarity for producing said first predetermined number of poles or in parallel to form adjacent poles of opposite instantaneous polarity for producing said second predetermined number of poles, an auxiliary winding wound in slots adjacent the slots occupied by said pole-generating windings of said primary winding and having polar axes coaxial with the polar axes of said pole-generating windings of said primary winding, said auxiliary winding being connectible in series with said pole-generating windings whenever said pole-generating windings are connected in parallel to produce said second predetermined number of poles, said auxiliary winding increasing the expanse of the poles produced by said pole-generating windings, and switch contacts that deenergize said auxiliary winding and that serially connect said pole-generating windings of said primary winding during starting but energize said auxiliary winding and connect said pole-generating windings of said primary winding in parallel during running of said motor.

6. A multispeed single phase motor comprising a primary winding arranged to selectively produce a first or a second predetermined number of poles, said primary winding including at least two poles selectively connectible in series to form alternate poles of like instantaneous polarity for producing said first predetermined number of poles or in parallel to form adjacent poles of opposite instantaneous polarity for producing said second predetermined number of poles, a secondary winding arranged to selectively produce a third or a fourth predetermined number of poles, said four predetermined numbers of poles providing four speeds for said motor, said secondary winding including at least two poles selectively connectible in series to form alternating poles of like instantaneous polarity for producing said third predetermined number of poles or in parallel to form adjacent poles of opposite instantaneous polarity for producing said fourth predetermined number of poles, and switch contacts that initially connect said poles of said primary winding in series relation and that subsequently retain said poles of said primary winding in said series relation or selectively connect said poles of said primary winding in parallel relation or disconnect said poles of said primary winding and connect said poles of said secondary winding in series or parallel relation.

7. A multispeed single phase motor comprising a primary winding arranged to selectively produce a first or a second predetermined number of poles, said primary winding including at least two poles selectively connectible in series to form alternate poles of like instantaneous polarity for producing said first predetermined number of poles or in parallel to form adjacent poles of opposite instantaneous polarity for producing said second predetermined number of poles, a secondary winding arranged to selectively produce a third or a fourth predetermined number of poles, said four predetermined numbers of poles providing four speeds for said motor, said secondary winding including at least two poles selectively connectible in series to form alternating poles of like instantaneous polarity for producing said third predetermined number of poles or in parallel to form adjacent poles of opposite instantaneous polarity for producing said fourth predetermined number of poles, and switch contacts that initially connect said poles of said primary winding in series relation and that subsequently retain said poles of said primary winding in said series relation or selectively connect said poles of said primary winding in parallel relation or disconnect said poles of said primary winding and connect said poles of said secondary winding in series or parallel relation, said poles of said starting winding providing good starting characteristics for said motor whenever said poles are connected in series relation.

8. A multispeed single phase motor comprising a primary winding arranged to selectively produce a first or a second predetermined number of poles, said primary winding including at least two pole-generating windings selectively connectible in series to form alternate poles of like instantaneous polarity for producing said first predetermined number of poles or in parallel to form adjacent poles of opposite instantaneous polarity for producing said second predetermined number of poles, and an auxiliary winding wound in slots adjacent the slots occupied by said pole-generating windings of said primary winding and having polar axes coaxial with the polar axes of said pole-generating windings of said primary winding, said auxiliary winding being connectible in series with said pole-generating windings whenever said pole-generating windings are connected in parallel to produce said second predetermined number of poles, said auxiliary winding coacting with said pole-generating windings of said primary winding, whenever said pole-generating windings of said primary winding are connected in parallel, to provide substantially sinusoidal distribution.

References Cited in the file of this patent

UNITED STATES PATENTS

| | | |
|---|---|---|
| 1,867,328 | Rienks | July 12, 1932 |
| 1,880,565 | Weichsel | Oct. 4, 1932 |
| 1,933,497 | Morrill | Oct. 31, 1933 |
| 1,961,793 | Schaefer | June 5, 1934 |
| 2,068,559 | Michelsen | Jan. 19, 1937 |
| 2,244,757 | Appleman | June 10, 1941 |
| 2,267,805 | Appleman | Dec. 30, 1941 |
| 2,671,879 | Schwarz | Mar. 9, 1954 |